United States Patent
Gurovski et al.

(10) Patent No.: US 10,326,917 B2
(45) Date of Patent: Jun. 18, 2019

(54) MONITORING CAMERA

(71) Applicant: AXIS AB, Lund (SE)

(72) Inventors: Igor Gurovski, Bunkeflostrand (SE); Thomas Ekdahl, Södra Sandby (SE)

(73) Assignee: AXIS AB, Lund (SE)

( * ) Notice: Subject to any disclaimer, the term of this patent is extended or adjusted under 35 U.S.C. 154(b) by 116 days.

(21) Appl. No.: 15/159,175

(22) Filed: May 19, 2016

(65) Prior Publication Data

US 2017/0006192 A1    Jan. 5, 2017

(30) Foreign Application Priority Data

Jun. 30, 2015  (EP) .................................... 15174624

(51) Int. Cl.
| | | |
|---|---|---|
| *H04N 5/217* | (2011.01) | |
| *H04N 5/232* | (2006.01) | |
| *H04N 7/18* | (2006.01) | |
| *H04N 5/225* | (2006.01) | |

(52) U.S. Cl.
CPC ......... *H04N 5/2171* (2013.01); *H04N 5/2252* (2013.01); *H04N 5/232* (2013.01); *H04N 7/18* (2013.01); *H04N 5/23212* (2013.01)

(58) Field of Classification Search
CPC .... H04N 5/2171; H04N 7/18; H04N 5/23212; H04N 5/232; H04N 5/2252
See application file for complete search history.

(56) References Cited

U.S. PATENT DOCUMENTS

| | | | |
|---|---|---|---|
| 4,267,443 A * | 5/1981 | Carroll ..................... | G01V 8/20 250/221 |
| 4,736,191 A | 4/1988 | Matzke et al. | |
| 5,305,017 A | 4/1994 | Gerpheide | |
| 6,607,606 B2 * | 8/2003 | Bronson ................. | B08B 17/02 134/104.1 |
| 7,259,367 B2 * | 8/2007 | Reime ................... | B60S 1/0822 250/221 |
| 8,031,224 B2 * | 10/2011 | Linsenmaier .......... | G03B 17/18 348/118 |

(Continued)

FOREIGN PATENT DOCUMENTS

| | | |
|---|---|---|
| CN | 1559120 A | 12/2004 |
| CN | 102594590 A | 7/2012 |

(Continued)

OTHER PUBLICATIONS

Machine generated translation of JP 02-281132 A to Kurata, Nov. 1990.*

(Continued)

*Primary Examiner* — David E Harvey
(74) *Attorney, Agent, or Firm* — Volpe and Koenig, P.C.

(57) ABSTRACT

A monitoring camera is equipped with a touch sensor in a camera cover glass, which senses positions of objects touching or being close to the cover glass. The touch sensor aids the camera in separating image data depicting objects on the cover glass from image data depicting the monitored scene. This information may be used when choosing image capture settings, by indicating to the camera which image regions are less important to take into account, and to avoid false alarms which otherwise may occur when rain drops or insects on the cover glass are mistaken for events in the scene.

8 Claims, 3 Drawing Sheets

(56) References Cited

U.S. PATENT DOCUMENTS

| | | | |
|---|---|---|---|
| 9,473,719 B2* | 10/2016 | Chien | H04N 5/374 |
| 2006/0163458 A1* | 7/2006 | Reime | B60S 1/0822 |
| | | | 250/227.25 |
| 2006/0171704 A1* | 8/2006 | Bingle | B60R 11/04 |
| | | | 396/419 |
| 2007/0115357 A1* | 5/2007 | Stein | B60Q 1/0023 |
| | | | 348/148 |
| 2007/0237517 A1* | 10/2007 | Park | G03B 17/00 |
| | | | 396/427 |
| 2008/0072393 A1* | 3/2008 | Tanaka | A47L 1/02 |
| | | | 15/250.03 |
| 2008/0192984 A1* | 8/2008 | Higuchi | G08G 1/16 |
| | | | 382/104 |
| 2011/0292212 A1* | 12/2011 | Tanabe | B05B 1/08 |
| | | | 348/148 |
| 2012/0087573 A1* | 4/2012 | Sharma | G06K 9/00771 |
| | | | 382/154 |
| 2014/0010408 A1* | 1/2014 | Irie | G06K 9/00791 |
| | | | 382/103 |
| 2014/0184521 A1 | 7/2014 | Kwong et al. | |
| 2014/0232869 A1* | 8/2014 | May | H04N 7/18 |
| | | | 348/148 |
| 2014/0307144 A1 | 10/2014 | Jeong | |
| 2015/0138357 A1* | 5/2015 | Romack | G02B 27/0006 |
| | | | 348/148 |
| 2015/0172582 A1* | 6/2015 | Kiyohara | G06K 9/00791 |
| | | | 348/322 |
| 2015/0277111 A1* | 10/2015 | Bell | G02B 27/0006 |
| | | | 359/509 |
| 2015/0296108 A1* | 10/2015 | Hayakawa | G03B 17/08 |
| | | | 348/148 |
| 2015/0302257 A1* | 10/2015 | Takemura | H04N 5/2171 |
| | | | 382/104 |
| 2016/0162740 A1* | 6/2016 | Takemura | G06K 9/0791 |
| | | | 348/148 |
| 2016/0165101 A1* | 6/2016 | Akiyama | H04N 5/23229 |
| | | | 348/187 |
| 2016/0284076 A1* | 9/2016 | Voros | G06T 7/0004 |
| 2017/0115235 A1* | 4/2017 | Ohlsson | G06F 3/0418 |
| 2017/0131621 A1* | 5/2017 | Tang | B64D 47/08 |
| 2017/0182980 A1* | 6/2017 | Davies | B60S 1/56 |
| 2017/0374261 A1* | 12/2017 | Teich | H04N 5/332 |
| 2018/0105101 A1* | 4/2018 | Tatara | F21V 19/00 |
| 2018/0178259 A1* | 6/2018 | Gillies | H04N 5/2252 |

FOREIGN PATENT DOCUMENTS

| | | | |
|---|---|---|---|
| CN | 104104847 A | | 10/2014 |
| EP | 2381416 A1 | * | 10/2011 |
| EP | 2587462 A1 | | 5/2013 |
| JP | 02-281132 A | * | 11/1990 |
| JP | 2011-138309 A | | 7/2011 |
| TW | 2015-19649 A | | 5/2015 |
| WO | WO 2010/038223 A1 | * | 4/2010 |

OTHER PUBLICATIONS

Chinese Office Action for Chinese Patent Application No. 201610391079.4 dated Aug. 30, 2017.

Notice of Allowance, TW Patent Application No. 105117444, dated Mar. 19, 2018, 5 pages.

* cited by examiner

MONITORING CAMERA

CROSS REFERENCE TO RELATED APPLICATION

This application claims the benefit of European Patent Application No 15174624.5 filed on Jun. 30, 2015, which is incorporated by reference as if fully set forth.

FIELD OF INVENTION

The present invention relates to a camera and a method for monitoring a scene by a camera.

BACKGROUND

Monitoring cameras are commonly used to monitor building, roads, shops and various other places. In particular, cameras are often used to monitor scenes to allow automatic detection or tracking of events in the form of presence of motion or presence of an object of a specific type. Such monitoring cameras can be used both indoors and outdoors. A monitoring camera mounted outdoors is sometimes exposed to harsh weather conditions such as wind, snow and rain. Additionally, dust and dirt carried by winds or from air pollution may be deposited on the camera. A common problem which occurs when rain drops or collections of dust particles are present in the view of the camera is that these by mistake trigger alarms. This typically happens when the camera is unable to separate a small object close by, such as a rain drop trickling down the cover glass of the camera lens, from a larger object more far away, such as a car or a person moving at a distance from the camera.

Another problem which may occur when water drops or spots of dirt is present on a cover glass of the camera is that the camera's focus lens system will focus on the water drops or the spots, instead of on more interesting objects in the monitored environment. These "real" objects may then become blurry and difficult to see for an operator.

Different solutions have been presented in this area. One example is disclosed in Applicant's EP 2 587 462, where data from the auto-focus mechanism is utilized to find the distance to an object and only objects that are within a certain distance interval to the camera are considered objects of interest and allowed to trigger an alarm. Other solutions also exist, such as using active distance measurement devices, e.g. based on lasers or ultrasound measurements, in order to make sure that objects that are close to the camera do not trigger alarms. However, there is still room for more improvement in this area.

SUMMARY

In view of the above, it is thus an object of the present invention to reduce the risk of raindrops or other object such as insects on the camera cover glass influencing the operation of the camera.

In accordance with a first aspect of the invention, a camera arranged to monitor a scene comprises a transparent cover glass, an image capturing unit arranged to capture a stream of images of the scene through the cover glass, an image processing unit arranged to receive the stream of images from the image capturing unit, wherein the cover glass comprises a touch sensor arranged to sense positions of objects in the camera view touching the cover glass, wherein the camera is arranged to control at least one of the image capturing unit or the image processing unit based on data from the touch sensor.

The touch sensor provides a means for the camera to distinguish between objects on or in close proximity to the cover glass and objects at a larger distance and actually in the scene which are of more interest, and in this way the functioning of camera may be improved. The camera may present fewer false alarms and it may also accomplish more accurate imaging settings which lead to better image quality.

The touch sensor may comprise at least one of a capacitive touch sensor or an optical in-glass sensor, the latter may also be denoted optical wave-guide touch sensor. Both of these options provide a touch sensor which is able to determine not only the presence of one or more objects, but also their positions. A capacitive sensor also has the advantages of comprising a commonly available and well-proven technology at a competitive price, and many different manufacturers and variants are available.

The camera may be arranged to control the image capturing unit, based on the touch sensor data, to apply a lower weight to image data from images regions coinciding with positions of objects touching the cover glass, than to remaining image data, for the purpose of determining parameters for image capturing settings. In particular, the camera may be arranged to control the image capturing unit to ignore image data from image regions coinciding with positions of objects touching the cover glass, for the purpose of determining parameters for image capturing settings. The image capturing settings may include at least one of: focus settings, exposure settings, white balance settings, IR cut filter mode, or iris control settings. By ignoring or attaching lower weight to this image data in the image capturing unit, more correct and useful settings for imaging are accomplished, in turn providing better image quality and more useful images.

The image processing unit may be arranged to detect events in the images, and the camera may be arranged to control the image processing unit based on the touch sensor data such that events at image positions coinciding with positions of objects touching the cover glass, are ignored. In this way, false alarm rates may be lowered and a more useful monitoring system is provided which will not send unnecessary alarms to an operator, in turn meaning the operator is free to concentrate on incidents actually needing attention.

The image processing unit may be arranged to detect events in the images by at least one of: detecting presence of change or motion in the images, such as by comparison of a current image to one or more previous images or to a background model; or detecting presence of a subject having a specific appearance, such as a face, a person, a vehicle, a license plate.

The camera may be arranged to control the image processing unit to reduce image resolution in image areas coinciding with objects touching the cover glass. In this way bandwidth or storage capacity may be spared by reducing the amount of image data stored or sent for uninteresting image regions, i.e. those image regions that are covered by objects on the cover glass.

The touch sensor data may be provided in the form of a virtual video stream. This may be advantageous e.g. in a situation where the image processing unit at least in part is remote from the camera, and is implemented in hardware or software which is adapted to receive video streams as input. The camera can then send one video stream containing image frames captured by the camera and one video stream containing the touch sensor data. This opens up the possibility to allow the remote image processing unit to detect events in both the "real" video stream from the camera, and the virtual video stream, and sort out events that are present in both of the streams at the same time and the same position as being "false" events which should not cause an alarm. The virtual video stream may be generated in the camera from the touch sensor data, and may also be used to visualize to an operator the positions of any objects on the cover glass, e.g. for the purpose of deciding if a maintenance visit is needed at the camera site.

The touch sensor data may additionally or as an alternative be provided in the form of a set of image coordinates indicating the position of objects touching the glass. This set of coordinates may indicate both time and position for objects detected at the cover glass and provides a convenient format for using in the image processing unit and the image capturing unit. The set of image coordinates may also be used by the camera, or by another processing unit such as a video management system, in generating a virtual video stream as mentioned above.

According to second aspect of the invention, a method of monitoring a scene by a camera comprises the steps of capturing, through a transparent cover glass, by an image capturing unit, a stream of images of the scene, receiving, by an image processing unit, the stream of images, sensing, by a touch sensor included in the cover glass, positions of objects in the camera view touching the cover glass, and controlling at least one of the image capturing unit or the image processing unit based on data from the touch sensor.

This aspect of the invention is associated with the same advantages as discussed above regarding the first aspect of the invention.

A further scope of applicability of the present invention will become apparent from the detailed description given below. However, it should be understood that the detailed description and specific examples, while indicating preferred embodiments of the invention, are given by way of illustration only, since various changes and modifications within the scope of the invention will become apparent to those skilled in the art from this detailed description.

Hence, it is to be understood that this invention is not limited to the particular component parts of the device described or steps of the methods described as such device and method may vary. It is also to be understood that the terminology used herein is for purpose of describing particular embodiments only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements or steps.

BRIEF DESCRIPTION OF THE DRAWINGS

The invention will now be described in more detail by way of example and with reference to the accompanying schematic drawings, in which.

DETAILED DESCRIPTION OF THE PREFERRED EMBODIMENTS

Figure 1:
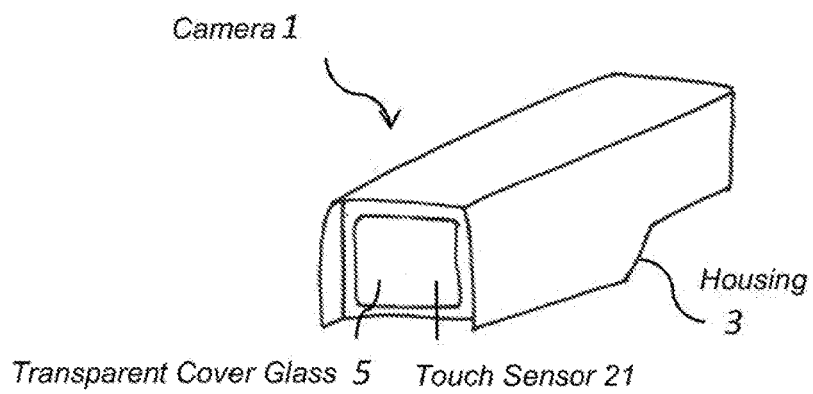
FIG. 1 shows a monitoring camera.

FIG. 1 illustrates a monitoring camera 1 mounted in a housing 3. The camera 1 has a transparent cover glass 5, through which the camera captures images of its environment. In FIG. 1 the cover glass is shown as being part of the housing 3, but it may just as well be mounted directly on the camera 1, such as on a camera lens.

Figure 2:
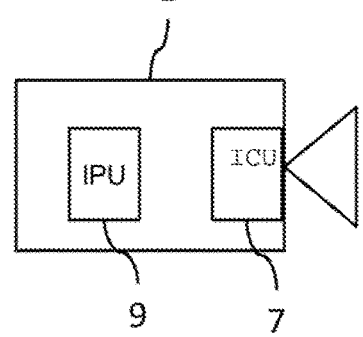
FIG. 2 shows a schematic view of components of the monitoring camera.

As shown in FIG. 2, the camera 1 comprises an image capturing unit (ICU) 7 and an image processing unit (IPU) 9. The image capturing unit 7 captures images which are received by the image processing unit 9.

The camera is able to automatically control the image capturing unit 7 to do a number of automatic settings to improve the image quality of captured images. Such settings are e.g. automatic focus (autofocus) settings, automatic exposure settings and automatic white balance settings. Additionally, the image capturing unit 7 may be equipped with an infrared, IR, cut filter, and the camera 1 may be able to automatically choose a proper setting for this filter, i.e. on or off. The camera 1 utilizes image data to alter or refine the settings used by the image capturing unit 7 to capture an image.

The image processing unit 9 may be physically located in the camera 1, as indicated in FIG. 2, but it may also, partly or wholly, be located in a position remote from the image capturing unit 7, and be connected to the image capturing unit 7 in the camera 1 via a cable or via a network. The image processing unit 9 analyzes the images captured by the image capturing unit 7 to find events that take place in the scene. The analysis may comprise detection of motion, usually by comparison with one or more previous images, e.g. in the form of a background image, or detection of subjects having a specific appearance, such as humans, faces, vehicles or license plates, such as by shape recognition.

Various thresholds and filters may be configured in the image processing unit 9, such as filters for ignoring motions that are too small or subjects that are too small, or have other characteristics that indicate that they are not associated with a subject of interest. In this way it might be possible to ignore motions that are caused by small animals running across the monitored scene. It may also be possible to setup motion or subject detection only in certain regions of the image, or to exclude certain image regions. In this way it is possible to avoid motion detection alarms triggered by wind blowing in a tree, by configuring an exclude region covering the tree.

Figure 3:
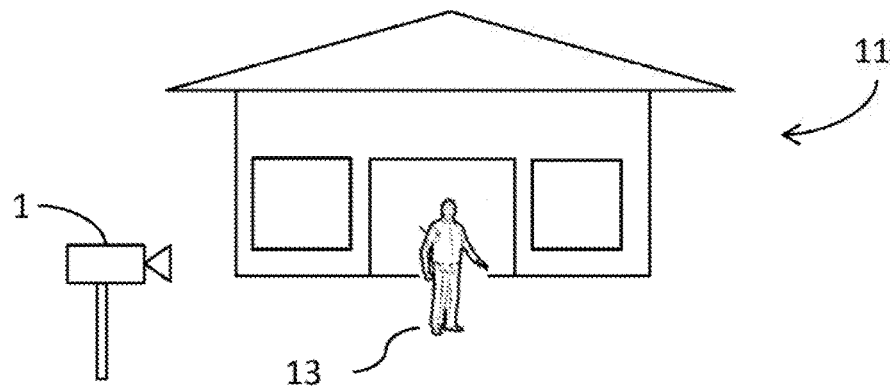
FIG. 3 shows the camera monitoring a scene.
Figure 4:
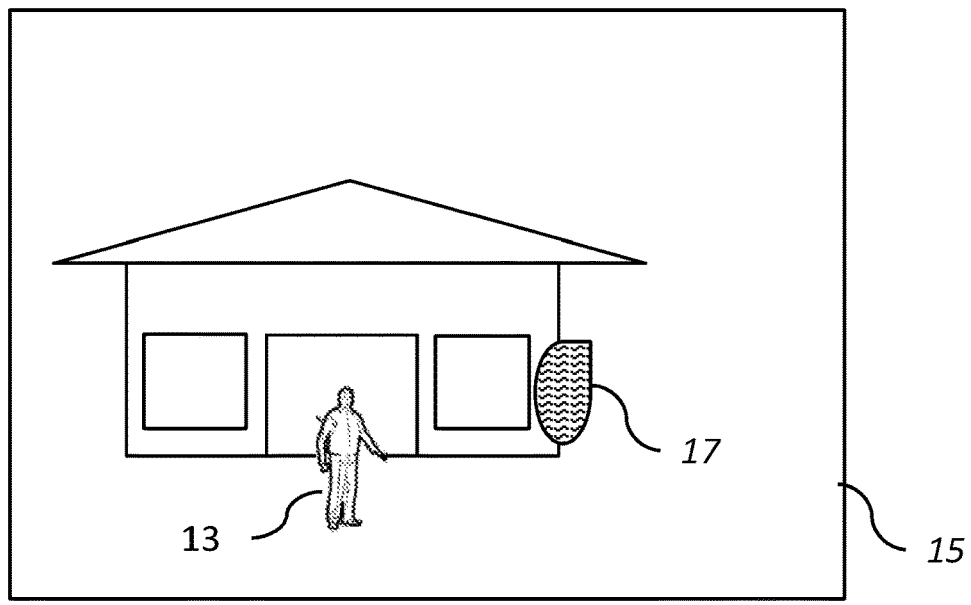
FIG. 4 shows an image of the monitored scene captured by the camera.

In FIG. 3, the camera 1 is shown mounted on a pole and arranged for monitoring a scene 11, wherein a subject 13 in the form of a person, is present and possibly moving around. An image 15 of the scene 11, captured by the camera 1, is shown in FIG. 4. The image illustrates one frame in a sequence of image frames in a video stream captured by the monitoring camera 1. A very noticeable rain drop 17 is also present in the image 15. This rain drop is located on the cover glass 5. As this water drop travels across the glass, it will move through the image and give rise to a motion detection event, which in turn will cause a false motion detection alarm to an operator. Since the raindrop is about the same size as the subject 13 in the image 15, it is not possible to use a size threshold to discriminate it. Neither would it help to configure an image region where motion should be ignored, since rain drops may impinge anywhere on the cover glass 5. Another problem which may occur is that the camera will pay too much attention to the raindrop when automatically selecting imaging settings such as focus, exposure etc. The image regions depicting the scene and actually being of interest may then run a risk of becoming blurry, over- or underexposed and so forth.

Figure 5:
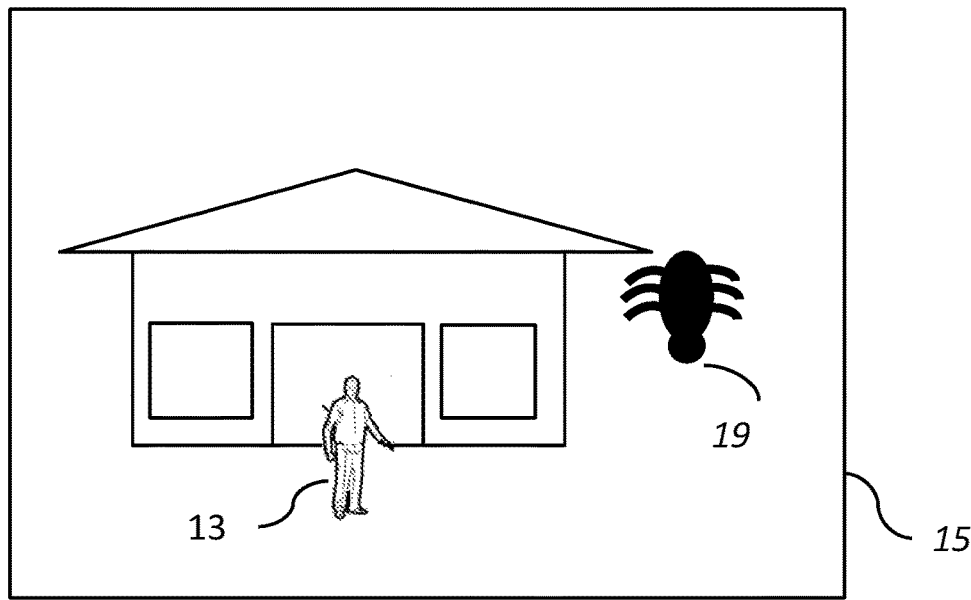
FIG. 5 shows another image of the monitored scene captured by the camera.

In FIG. 5 another image 15 of the scene 11 is shown. In this image the subject 13 is also present, and instead of a rain drop, an insect 19 has landed on the cover glass 5 and has been captured in the image 15. In the same way as in the rain drop case discussed in relation to FIG. 4, the insect may move across the cover glass. If the insect is a spider hanging in a web, it might also sway back and forth across the camera view for a long period of time. Both of these movements will likely cause a motion detection alarm, and in the same way as just described, the movements caused by the insect cannot be filtered out using a size based filter or an image region based filter. The insect may also, in the same manner as the rain drop, cause improper imaging settings to be selected by the camera for the image capturing unit.

Other objects may also occur on the camera cover glass, such as collections of dust particles and other contaminations. These may give rise to the same issues.

The idea presented in this application is therefore to provide a more efficient mechanism for filtering out image regions depicting uninteresting objects on the cover glass 5 of the camera 1. This is done by providing a touch sensor 21 in or on the cover glass 5. The touch sensor 21 will register any objects that are in contact with or in close proximity to the cover glass 5, and this information is then used by the camera 1 to improve the operation of one or both of the image processing unit 9 and the image capturing unit 7.

The touch sensor 21 is able to sense the positions of different objects touching the cover glass 5, i.e. the touch sensor has so called multi-touch capabilities, and is able to feel light touches, not only heavy object impinging on the cover glass 5. Additionally, since the touch sensor 21 is arranged on or in the cover glass 5, such as in one layer of a multi-layered cover glass, and the camera 1 captures images through the cover glass 5, the touch sensor is transparent so that it does not unduly impair the camera view through the cover glass 5.

Different touch sensor technologies may be used. Some examples are touch sensors based on IR proximity sensing or optical light-guide based touch sensors, e.g. similar to the InGlass™ optical touch sensors provided by the company Flatfrog. However, the most common choice would be a capacitive touch sensor, of the same type used in many touch screen devices, such as mobile phones. Capacitive touch sensors e.g. have the advantages of being commonly available, reasonably priced, easily allows for a see-through installation and also provides the required multi-touch capability as well as being able to sense light touches and even objects that are not in direct contact but in the close proximity of the cover glass.

A capacitive touch sensor is typically provided by coating an insulating material, such as glass, with a transparent conductor, usually indium tin oxide (ITO). When an object having a different dielectric constant than air, such as a raindrop or an insect, touches the surface of the sensor, or comes close to the sensor, this causes a change in the dielectric constant. Hence, there will be a distortion in the electrostatic field of the sensor, measurable as a change in capacitance. Two examples of different types of capacitive sensors are mutual capacitance sensors, where the object alters the mutual coupling between row and column electrodes, which are scanned sequentially, and self- or absolute capacitance sensors, where the object loads the sensor or increases the parasitic capacitance to ground. Different capacitive touch sensor technologies are described e.g. in U.S. Pat. Nos. 4,736,191 and 5,305,017.

Thus, the cover glass touch sensor 21 is able to provide data specifying the position(s) of objects, such as raindrops or insects, touching the cover glass 5. This data can then be used to control the operation of the camera 1.

As a first example, the touch sensor data can be used to improve the operation of the image capturing unit 7, e.g. by allowing the image capturing unit 7 to apply a lower weight to, or completely ignore, image data from image regions coinciding with the objects that are touching the cover glass 5, when automatically determining imaging settings.

The autofocus algorithm may e.g. be controlled to ignore, or apply a lower weight to, this image data. This means that it is made more certain that the focus will be set to a distance which renders the monitored scene sharp. The objects on the cover glass 5 will likely be blurry, but since they are almost always of no interest, this is normally not a concern.

Additionally, the exposure setting algorithm may be instructed in a similar fashion, meaning that the exposure time will be set correctly based on the scene, and not based on any irrelevant objects positioned on or close to the cover glass 5.

The automatic white balance algorithm may also be controlled to ignore, or attach less weight to, image data from image regions coinciding with the objects touching the cover glass 5. In this way the white balance will be better adapted to the image regions depicting the monitored scene. Objects on the cover glass may not be depicted correctly, but, as noted above, this would normally be of no concern.

The touch sensor data may also be used to in the control the filter mode, i.e. on or off, for an IR cut filter, such that data from the image regions corresponding to the objects touching the cover glass 5 are ignored, or attached less weight to, when determining whether this filter should be used for imaging the scene or not.

When the camera is equipped with a mechanism for automatic iris control, this mechanism may also be influenced by the touch sensor data in the same way, i.e. the image data from the regions where objects are touching the cover glass 5 are ignored or attached less weight to, for the purpose of controlling the iris setting. The automatic iris may also be controlled to reduce the depth of field in order to be able to "see past" or reduce the impact of an object on the cover glass.

In addition to, or instead of, using the data from the cover glass touch sensor 21 when controlling the image capturing unit 7, this data may be used in the control of the image processing unit 9. When the image processing unit 9 analyzes the images from the image capturing unit 7 and finds an event, i.e. and object or a movement in an image region, the touch sensor data can be used to determine of this event is caused by an object or movement in the surveilled area, at a distance from the camera 1, or if it is caused by an object, such as a rain drop or an insect, which is located on or very close to the cover glass 5. In the latter case, there will be touch sensor data indicating the presence of an object at a certain position on the cover glass 5.

The touch sensor data and the result of the analysis from the image processing unit 9 may then be combined to determine which events, of those found by the image processing unit 9, correspond to movements or objects in the scene, and which correspond to contamination on the cover glass 5. The events not corresponding to objects on the cover glass 5 are much more likely to be of interest to a security operator and may therefore be flagged differently than the events that correspond to objects on the cover glass 5. As one example, alarms may be issued, or log entries may be made, only for the events that do not correspond to objects on the cover glass 5, and the events that are detected in image positions that coincide with positions of objects touching the cover glass 5 may be ignored.

In an alternative implementation, these events may be ignored even earlier in the process by the touch sensor data being used such that the image processing unit 9 is controlled to only detect movement or objects in those areas where the touch sensor does not indicate any objects on the cover glass 5.

Thus, the touch sensor data may be used to provide dynamic filters for the image processing unit, e.g. such that areas of the image, where the touch sensor indicates an object on the cover glass, are set as areas to be excluded from event detection.

In summary, in both of these implementations, the image processing unit 9 will be able to ignore events at image positions coinciding with positions of objects touching the cover glass, either by never detecting these events, or by sorting them out after detection as being uninteresting.

As a further option, the touch sensor data may be used to save storage space or bandwidth by allowing the image processing unit to lower the resolution in the images regions coinciding with objects on the cover glass. Since these areas, as previously stated, most likely do not contain any information of interest, providing less details here is not a problem.

The touch sensor data may be provided as a set of coordinates which indicate where the objects are touching the cover glass. This set of coordinates will usually indicate both time and position, and the extension of the objects, in order to capture a situation where a raindrop or an insect or other contamination moves over the cover glass. The touch sensor data may also include more static components, which indicate objects that are in contact or close to the cover glass in the same position for a longer time period.

The touch sensor data may in some cases be provided in the form of a virtual, i.e. artificially generated, video stream, which visualizes the objects touching the cover glass. Providing the touch sensor data in this form may e.g. be useful if the image processing, and more precisely, the event detection, takes place remote from the image capturing unit, such as in a video management system, and this system is adapted to receive input in the form of video streams. The touch sensor data can then easily be received at the remote end, without any special arrangements having to be made to accommodate the format of the touch sensor data. If touch sensor data in the form of a set of coordinates (changing over time) is to be used in this setup, the receiving end must be adapted to receive data in this format—if it is provided in the form of a video stream, adaptation may be avoided.

The virtual video stream may then be combined or correlated with the "normal" video stream from the camera, in order to find areas where events in the normal stream should either not be detected at all, or be ignored when detected.

The virtual video stream could e.g. be generated from the set of time-dependent coordinates mentioned above. The image capturing unit may also be able to receive the touch sensor data in the form of the virtual video stream, but it would most likely be more convenient to use the set of coordinates representative of the touch sensor data in the image capturing unit.

Figure 6:
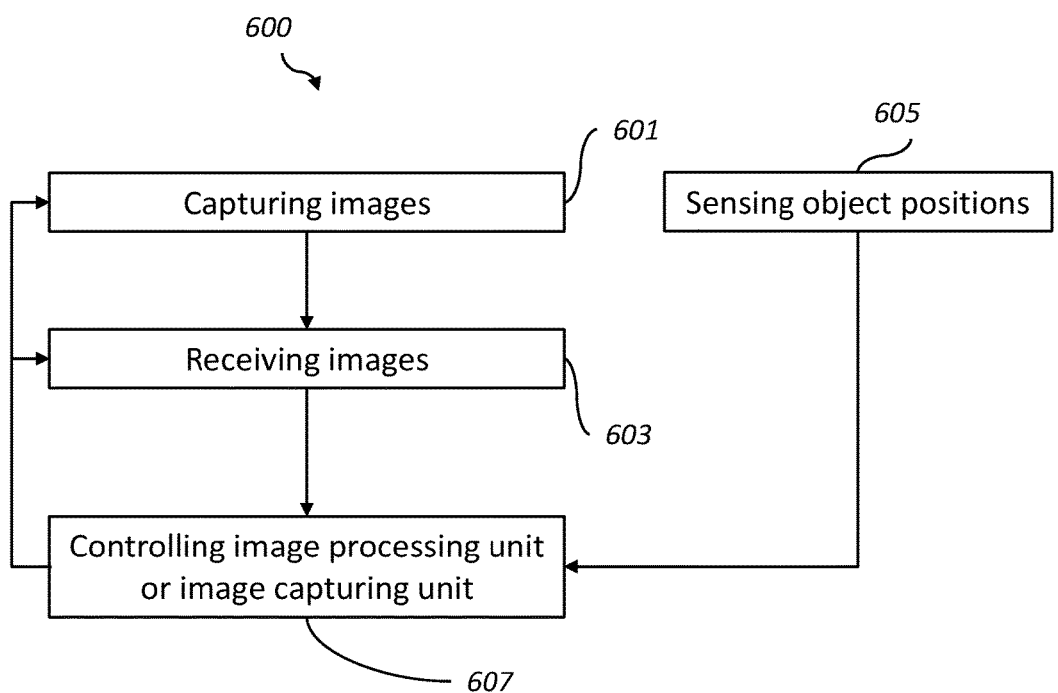
FIG. 6 illustrates a method of monitoring a scene.

In FIG. 6, a method 600 of monitoring the scene by the camera according to embodiments of the invention is illustrated. In step 601, the stream of images is captured through the transparent cover glass by the image capturing unit. In step 603, the stream of images is received by the image processing unit. In step 605, a touch sensor included in the cover glass senses positions of objects touching the cover glass, and in step 607, either or both of the image processing unit and the image capturing unit are controlled based on the data from the touch sensor.

In summary, the present application relates to a monitoring camera 1 which is equipped with a touch sensor 21 in a camera cover glass 5, which senses positions of objects touching or being close to the cover glass 5. The touch sensor 21 aids the camera 1 in separating image data depicting objects on the cover glass 5 from image data depicting the monitored scene. This information may be used when choosing image capture settings, by indicating to the camera which image regions are less important to take into account, and to avoid false alarms which otherwise may occur when rain drops 17 or insects 19 on the cover glass 5 are mistaken for events in the scene.

LIST OF REFERENCE NUMERALS

1 Camera
3 Housing
5 Cover glass
7 Image capturing unit
9 Image processing unit
11 Monitored scene
13 Subject (person)
15 Image
17 Rain drop
19 Insect
21 Touch sensor

What is claimed is:

1. A device arranged to monitor a scene, comprising:
a transparent cover; and
a camera, arranged to:
  capture a stream of images of the scene through the transparent cover, and
  process the stream of images to detect events that take place in the scene, wherein the detecting of events in the images includes at least one of:
    detecting presence of change or motion in the images, or
    detecting presence of a subject having a specific appearance,
  wherein the transparent cover comprises a non-imaging touch sensor for sensing touch and arranged to sense positions of objects in a view of the camera,
  wherein the camera is arranged to modify at least one aspect of the capturing of the stream of images based on data from the touch sensor, by ignoring or applying less weight to image data from image regions coinciding with positions of objects touching a cover glass, than to remaining image data, for the purpose of determining parameters for image capturing settings,
  or to modify at least one aspect of the processing of the stream of images based on data from the touch sensor, by flagging events, detected by image processing in image regions coinciding with positions of objects touching the cover glass, differently to events detected by image processing in the remaining image, or by lowering image resolution in image regions coinciding with positions of objects touching the cover glass.

2. The device of claim 1, wherein the touch sensor comprises at least one of a capacitive touch sensor or an optical in-glass sensor.

3. The device of claim 1, wherein the image capturing settings include at least one of: focus settings, exposure settings, white balance settings, IR cut filter mode, or iris control settings.

4. The device of claim 1, wherein touch sensor data is provided in the form of a virtual image stream.

5. The device of claim 1, wherein the touch sensor data is provided in the form of a set of image coordinates indicating the positions of objects touching the cover glass.

6. A method of monitoring a scene by a camera, comprising the steps of:
   capturing, through a transparent cover, a stream of images of the scene;
   processing the stream of images to detect events that take place in the scene, wherein the detecting of events in the images includes at least one of:
      detecting presence of change or motion in the images, or
      detecting presence of a subject having a specific appearance,
   sensing, by a non-imaging touch sensor for sensing touch and included in the transparent cover, positions of objects in a camera view touching the transparent cover; and
   modifying at least one aspect of the capturing of the stream of images based on data from the touch sensor, by ignoring or applying less weight to image data from image regions coinciding with positions of objects touching a cover glass, than to remaining image data, for the purpose of determining parameters for image capturing settings,
   or modifying at least one aspect of the processing of the stream of images based on data from the touch sensor by flagging events, detected by image processing in image regions coinciding with positions of objects touching the cover glass, differently to events detected by image processing in the remaining image; or by lowering image resolution in image regions coinciding with positions of objects touching the cover glass.

7. The device of claim 1, wherein:
   detecting the change or motion in the images comprises comparing a current target to one or more previous images or to a background model; and
   the specific appearance comprises one of a face, a person, a vehicle, and a license plate.

8. The method of claim 6, wherein:
   detecting the change or motion in the images comprises comparing a current target to one or more previous images or to a background model; and
   the specific appearance comprises one of a face, a person, a vehicle, and a license plate.

* * * * *